United States Patent [19]

Quaak et al.

[11] Patent Number: 5,297,496
[45] Date of Patent: Mar. 29, 1994

[54] PROCESS FOR THE COMBINED TREATMENT OF WASTE MATERIALS

[75] Inventors: Marinus P. Quaak, Woerden; Johannes Bouman, Dordrecht, both of Netherlands

[73] Assignee: Ecotechniek B.V., Utrecht, Netherlands

[21] Appl. No.: 934,506

[22] PCT Filed: Apr. 11, 1991

[86] PCT No.: PCT/NL91/00058
§ 371 Date: Dec. 14, 1992
§ 102(e) Date: Dec. 14, 1992

[87] PCT Pub. No.: WO91/16154
PCT Pub. Date: Oct. 31, 1991

[30] Foreign Application Priority Data

Apr. 12, 1990 [NL] Netherlands ............... 9000868

[51] Int. Cl.$^5$ ............................................. F23G 7/00
[52] U.S. Cl. .................................. 110/346; 110/229; 110/236; 110/238
[58] Field of Search ............... 110/346, 238, 229, 347, 110/236; 44/280

[56] References Cited

U.S. PATENT DOCUMENTS

| | | | |
|---|---|---|---|
| 4,599,954 | 7/1986 | Williams | 110/346 |
| 4,762,527 | 8/1988 | Beshore et al. | 110/346 X |
| 4,938,155 | 7/1990 | Williams | 110/345 |
| 5,035,189 | 7/1991 | Lunsford | 110/346 |

Primary Examiner—Edward G. Favors
Attorney, Agent, or Firm—Harness, Dickey & Pierce

[57] ABSTRACT

The invention relates to a process for the combined treatment of waste materials of two types A and B, A being waste material having a relatively high energy content and B being a water containing waste material having a relatively low energy content, said process comprising the following steps: 1) pyrolyzing material A to produce a gas and/or oil and a carbonaceous residue, 2) mixing said carbonaceous residue with B to form a water containing mixture C, 3) shaping said mixture C into individual pieces, 4) drying and baking said pieces to ceramic bodies, wherein in step 2. the carbonaceous residue is used in such an amount that less than about 80% of the totally required baking energy is contained in mixture C.

15 Claims, 1 Drawing Sheet

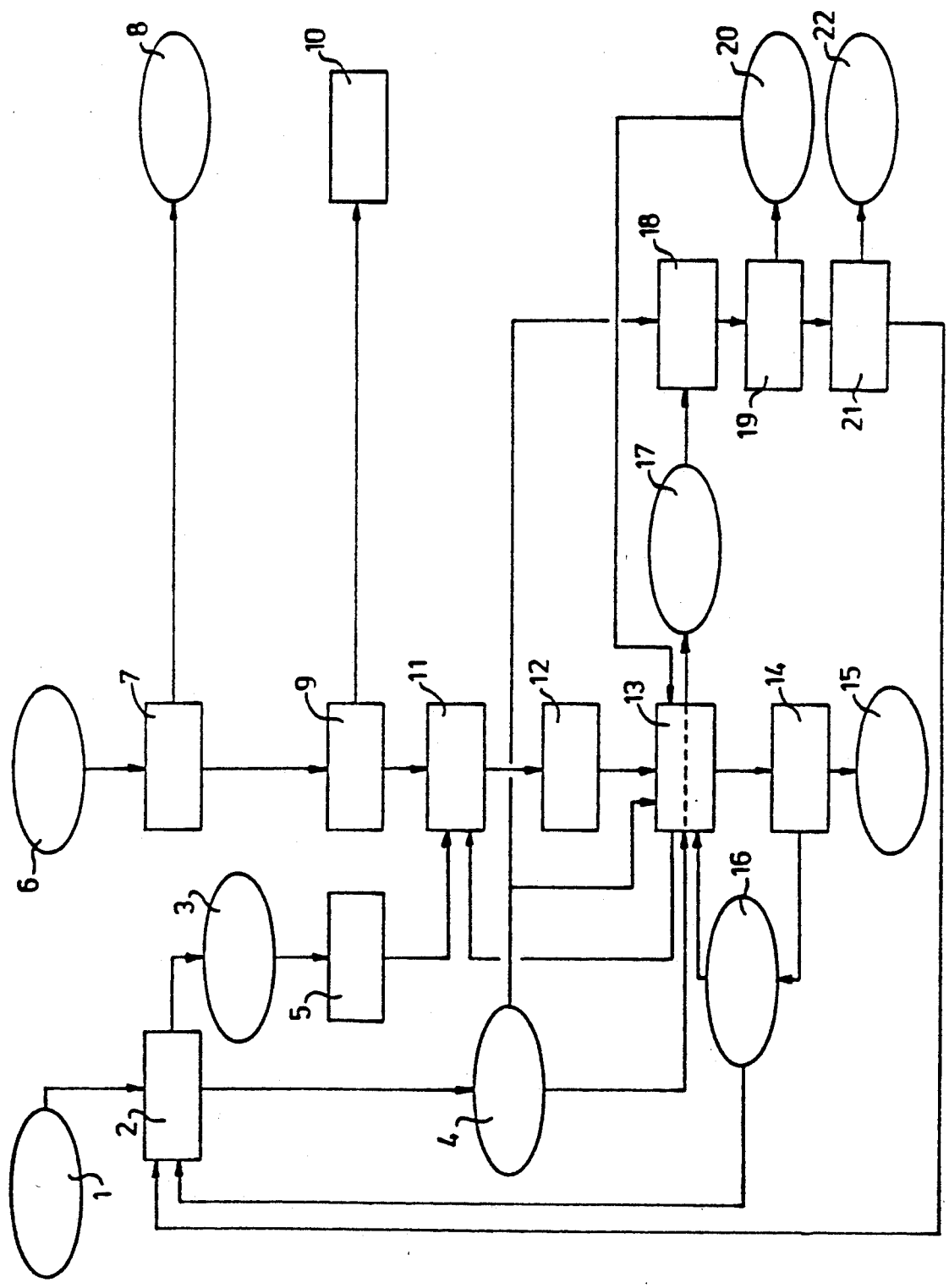

PROCESS FOR THE COMBINED TREATMENT OF WASTE MATERIALS

The present invention relates to a process for the combined treatment of waste materials of two types A and B. A being waste material having a relatively high energy content and B being a water containing waste material having a relatively low energy content.

It is known from DE-A 3635068 to pyrolyze waste material, in particular soil polluted with oil. This process is carried out at a temperature of 400°-300° C. The gaseous components produced during the pyrolysis are used as fuel gas. It is disclosed that with the process not only waste material and sludge from purification installations, but also waste oil and polluted soil may be processed at the same time. The just mentioned materials are first dried, gas is removed at a temperature of about 600° C. and at a temperature above 1200° C. the material is incinerated and brought into a ceramic form. The produced gas is first reduced in general by using a cokes bed, then washed and, subsequently, used as fuel. The residue of the pyrolysis contains cokes, which absorbs harmful substances such as heavy metals. By this absorption the residue is environmetally unharmful. During the after-combustion, which is performed after the pyrolysis, additives such as combustible materials or fly ash may be added in order to obtain an inert or ceramic product.

EP-A-0 168 532 and EP-A- 0 217 4433 discloses methods for processing sludges such as dredging mud, possibly mixed with industrial sludge, purification sludge and similar materials, or with powdery combustion residues such as fly ash, wherein the sludge is converted into a plastic mass by drying and/or mixing, said mass being brought into shape of individual pieces, which pieces are made to ceramic bodies by drying and baking. This drying and baking is carried out under oxidizing conditions and under a specific gradual increase of temperature. After a drying step the pieces (pellets) are first heated at a temperature in the range of 500°-900° C., e.g. 700° C. and then at a temperature of about 1100° C., e.g. 1100°-1160° C. This process yields a ceramic product which is environmetally safe.

A problem of the just mentioned process is that a substantial amount of energy should be supplied, in particular for the sintering step.

Surprisingly, it has been found that this problem can be solved by the combined treatment of waste materials of two types A and B. A being waste material having a relatively high energy content and B being a water containing waste material having a relatively low energy content.

SUMMARY OF THE INVENTION

According to the invention this treatment comprises the following steps:
1. pyrolyzing material A to produce a gas and/or oil and a carbonaceous residue.
2. mixing said carbonaceous residue with B to form a water containing mixture C,
3. shaping said mixture C into individual pieces,
4. drying and baking said pieces to ceramic bodies, wherein in step 2. the carbonaceous residue is used in such an amount that less than about 80% of the totally required baking energy is contained in mixture C.

BRIEF DESCRIPTION OF THE DRAWINGS

FIG. 1 is a schematic illustration of the process of the invention.

DETAILED DESCRIPTION OF THE PREFERRED EMBODIMENTS OF THE INVENTION

In the process of the invention material A contains preferably more than 40 wt. %, in particular more than about 60 wt. % of organic material, said percentages being based on dry matter. Examples of material A are oil sludge and sludge of purification plants. Such a sludge may contain e.g. 40-90 wt. % of organic material, based on dry matter. A feature of purification sludge is the presence of organic material in the form of fibrous material. Fibrous material may comprise e.g. 20-60 wt. % of the sludge on a dry basis.

In the process according to the invention material B contains preferably less than about 30 wt. %, in particular less than 20 wt. % of organic material, said percentages being based on dry matter. Examples of material B are polluted soil and dredging mud such as harbour mud, but also mud from rivers and lakes. In general, material of this type contains about 2-30 wt. % of organic material on a dry basis. As opposed to purification sludge of type A, dredging mud and polluted soil comprise a "short" material and not a fibrous material.

The pyrolysis of step 1, of the process according to the invention is preferably carried out at a temperature in the range of about 450°-725° C., in particular
  about 450°-600° C., preferably about 470°-520° C. for an oil-rich pyrolysis product and
  about 600°-725° C., preferably about 670°-700° C. for a gas-rich pyrolysis product, and under ambient pressure up to an overpressure of about 15 kP, preferably about 10-12 kP for an oil-rich product or up to an overpressure of about 5 kP, preferably about 3-3.5 kP for a gas-rich product.

The pyrolysis of the material of type A to produce mainly gas is preferred. At a temperature above 725° C. the gas product is substantially decreased and the pyrolyzed material is carbonized.

It is possible to add substances to the material to be pyrolyzed, which substances have a relatively high energy content. An example of such an additional material is wood snip.

The pyrolysis is carried out under oxygen-poor or oxygen-free conditions. In general, an amount of 1% by volume of oxygen will not be exceeded. Such oxygen may be included in the material to be pyrolyzed and liberated during the heating. If necessary, an inert gas such as nitrogen ray be added to the pyrolysis.

The pyrolysis gases are very well suited as fuel gases for e.g. the drying and/or baking step 4. of the process according to the invention. The calorific value of the flue gas is in general between 19.000-22.500 kJ/Nm$^3$.

In general, the pyrolysis is carried out in such a way and during such a period that in the pyrolysis residue about 5-20, preferably 8-12 parts by weight of carbonaceous residue is formed. It appeared that a residue having such an amount of carbonaceous material is well suited for the properties of the mixed material during the baking step. During this baking step the pyrolysis gases may be directly introduced in the heating device, in other words, pyrolysis gas may be injected into the flame.

Before the carbonaceous residue is mixed with B to form a water containing mixture C it is preferred to grind the carbonaceous residue. This grinding will improve the later homogenization in step 2. of the process of the invention.

The material B may, of course, be provided in such a condition that it can directly be used in mixing step 2. of the process of the invention. However, in most cases a pretreatment will be needed in order to dewater material B up to an acceptable content of water. The dewatering of a too much water containing starting material B may be carried out in accordance with EP-A-0 168 532. In general, it is convenient that the material B used in step 2. of the process according to the invention contains 40-60 wt. % of water.

It will be self-evident that the pyrolysis is also preceded by a dewatering step if the material A contains too much water. Preferably the material A contains less than 50% water when it enters the pyrolysis step 1. of the process of the invention.

In mixing step 2. of the process according to the invention an amount of e.g. 1-50, preferably 10-25 parts by weight of carbonaceous residue is used for 100 parts by weight of material B. This is an important and distinguishing feature with respect of the above-mentioned DE-A-3635068 as the known process uses a major amount of sludge having a relatively high energy content and a minor amount of mainly inorganic additives. According to the present invention always a major amount of mainly inorganic sludge of type B is used.

During the mixing step 2. of the process of the invention other materials, which may fall within the definition of material A as well as B, may be added. An important additive may be dried sludge, which may also serve for lowering the water content of the mixture.

The process according to the invention is very well suited for the processing of waste catalytic materials, e.g. zeolites, which are used in petrochemical industry. In general this specific waste material will be added in mixing step 2. of the process of the invention.

It has been fund that the maximum particle size of the material present in step 2. of the process according to the invention should preferably be less than about 0.5 mm. In general, a separate grinding step for material B will not be necessary. On the other hand, the pyrolysis residue will be in the form of a rather coarse slag-like material which should be particulated before the mixing step 2. It is convenient to reduce this coarse material to a maximum particle size of e.g. 0.5 mm, preferably 0.1 mm. In principle, however, the carbonaceous residue and material B may have about the same particle size distribution during the mixing step 2. The specific particle size attributes to the formation of homogeneous and mechanically strong individual pieces, and subsequently ceramic bodies gaving a uniform appareance.

The shaping step 3. of the process according to the invention maybe carried out in accordance with EP-A-0 168 532 or EP-A-0 239 683. This also applies for the drying/baking step 4.

In the process according to the invention step 4. comprises preferably a heating step in the presence of oxygen at a temperature of about 500°-900° C., in particular about 600°-800° C., e.g. about 700° C., and a sintering step at a temperature of about 1050°-1250° C., preferably 1100°-1200° C.

It is important that during the sintering step not more than about 80% of the totally required baking energy is contained in mixture C. A higher value than 80% would cause a spontaneous burning of the material to be sintered, which would result in a bad ceramic quality of the final product.

It is preferred that less than about 60%, in particular about 10-40% of the totally required baking energy is contained in mixture C.

The invention is further elucidated by the scheme as depicted in the drawing.

In this scheme a material having a relatively high energy content, e.g. sludge of a purification plant, is indicated by reference number 1. Waste material 1 is pyrolyzed in 2. This results in a carbonaceous residue 3 and a gas and/or oil phase 4. The optimum conditions for the production of oil or gas or both are given in the above.

On the other hand, a water containing waste material having a relatively low energy content, e.g., dredging mud, which is indicated by reference number 6, is screened in 7. Coarse material 8, e.g. having a particle size above 2 mm is removed. After this rather crude screening further, smaller fractions may be separated off (not depicted in the scheme).

The water content of the sludge is reduced in 9 up to a value of e.g. 30-50% wt., based on the dry matter. The dewatering step 9 may be carried out by a physical ageing in decantation basins.

After the dewatering to the desired value, the dewater mud originating from 9 as well as the carbonaceous residue 3, which is particulated in particle size reduction step 5, are brought into a mixing zone 11 in which a homogeneous mixture is prepared. This homogenization occurs by means of kneading, grinding or sifting or a combination thereof.

After the mixing and/or homogenization further dewatering to be achieved either by mechanical or thermal methods is carried out to the desired value, e.g. 65-75 wt. %, based on dry matter (not depicted in the scheme).

After homogenization the mixture C is brought into shape in zone 12. This shaping zone may comprise e.g. an extruder producing strands, which are cut into pieces. In fact, for the whole further processing of the individual pieces the principles of EP-A-0 168 532 or EP-A-0 217 433 may be followed.

After the shaping step 12 the individual pieces are brought into drying/baking zone 13. Although separate zones for both treatments may be used, it is convenient to perform the drying and sintering in the same oven. The specific conditions during step 13 are specified in the above description.

After cooling in 14 a ceramic product 15 is obtained. The cooling in 14 yields energy e.g. in the form of warm air 16, which is re-used in the process as appears from the scheme.

The flue gases produced during step 13 are indicated by reference number 17. In an after-burning zone 18 the flue gases 17 are heated to a maximum of e.g. 1200° C. Then, the flue gases are passed through heat exchanger 19 which yields energy in the form of e.g. hot air 20 which is re-used in the process as depicted in the scheme.

The cooled flue gases are further treated in a purification zone 21 to product purified flue gases 22. On the other hand, gases treated in zone 21 may be led to e.g. pyrolysis step 2, as depicted in the scheme.

We claim:

1. A process for the combined treatment of waste materials of two types A and B, A containing more than 40 wt. % of organic material and having a relatively high energy content and B being a water containing material containing less than 30 wt. % of organic material and having a relatively low energy content, said percentages being based on dry matter.

said process comprising the following steps:
1. pyrolyzing material A to produce a gas and/or oil and a carbonaceous residue.
2. mixing said carbonaceous residue with B to form a water containing mixture C.
3. shaping said mixture C into individual pieces,
4. drying and baking said pieces to ceramic bodies, wherein in step 2. the carbonaceous residue is used in such an amount that less than about 80% of the totally required baking energy is contained in mixture C.

2. The process according to claim 1, wherein A contains more than 60 wt. % of organic material, said percentage being based on dry matter, wherein A is sludge of purification plants or oil sludge.

3. The process according to claim 1, wherein B contains less than 20 wt. % of organic material, said percentage being based on dry matter, wherein B is dredging mud or polluted soil.

4. The process according to claim 1, wherein the pyrolysis of claim 1, step 1. is carried out at a temperature of about 450°-725° C. under ambient pressure up to an overpressure of about 3-15 kP.

5. The process of claim 1, wherein in the mixing step 2. of claim 1 an amount of about 1-50 parts by weight of carbonaceous residue is used for 100 parts by weight of material B.

6. The method according to claim 1, wherein the mixing of step 2. of claim 1 is preceded by a particle size reduction step for dewatered material B yielding a particulate or granular material having a maximum particle size of less about 0.5 mm, and a grinding step for the carbonaceous residue yielding a particulate or granular material having a maximum particle size of less than about 0.1 mm.

7. The process according to claim 1, wherein the baking of step 4. of claim 1 comprises a heating step in the presence of oxygen at a temperature of about 500°-900° C., and a sintering step at a temperature of about 1050°-1250° C.

8. The process according to claim 1, wherein in step 2. of claim 1 the carbonaceous residue is used in such an amount that less than about 60% of the totally required baking energy is contained in mixture C.

9. The process according to claim 4, wherein the pyrolysis of claim 1, step 1. is carried out at a temperature of about 450°-600° C. and under ambient pressure up to an overpressure of about 10-12 kP for an oil-rich pyrolysis product.

10. The process according to claim 4, wherein the pyrolysis of claim 1, step 1. is carried out at a temperature of about 600-725° C. and under ambient pressure up to an overpressure of about 3-3.5 kP for a gas-rich pyrolysis product.

11. The process according to claim 9, wherein the pyrolysis of claim 1, step 1. is carried out at a temperature of about 470°-520° C.

12. The process according to claim 10, wherein the pyrolysis of claim 1, step 1. is carried out at a temperature of about 670°-700° C.

13. The process of claim 5, wherein in the mixing step 2. of claim 1 an amount of about 10-25 parts by weight of carbonaceous residue is used for 100 parts by weight of material B.

14. The process according to claim 7, wherein the baking of step 4. of claim 1 comprises a heating step in the presence of oxygen at a temperature of about 600°-800° C., and a sintering step at a temperature of about 1100°-1200° C.

15. The process according to claim 1, wherein in step 2. of claim 1 the carbonaceous residue is used in such an amount that about 10-40% of the totally required baking energy is contained in mixture C.

* * * * *